(12) United States Patent
Hu et al.

(10) Patent No.: US 10,747,088 B2
(45) Date of Patent: Aug. 18, 2020

(54) CAMERA MODULE

(71) Applicant: TDK TAIWAN CORP., Yangmei Taoyuan (TW)

(72) Inventors: Chao-Chang Hu, Yangmei Taoyuan (TW); Chen-Hsien Fan, Yangmei Taoyuan (TW)

(73) Assignee: TDK Taiwan Corp., Yangmei Taoyuan (TW)

( * ) Notice: Subject to any disclaimer, the term of this patent is extended or adjusted under 35 U.S.C. 154(b) by 0 days.

(21) Appl. No.: 15/481,897

(22) Filed: Apr. 7, 2017

(65) Prior Publication Data

US 2017/0293105 A1 Oct. 12, 2017

Related U.S. Application Data

(60) Provisional application No. 62/320,096, filed on Apr. 8, 2016, provisional application No. 62/356,874, filed on Jun. 30, 2016.

(30) Foreign Application Priority Data

Mar. 17, 2017 (TW) .............................. 106108890 A

(51) Int. Cl.
| | |
|---|---|
| *G02B 7/02* | (2006.01) |
| *G03B 5/00* | (2006.01) |
| *G02B 27/64* | (2006.01) |
| *G03B 3/10* | (2006.01) |

(Continued)

(52) U.S. Cl.
CPC ............... *G03B 5/00* (2013.01); *G02B 7/102* (2013.01); *G02B 27/646* (2013.01); *G03B 3/10* (2013.01);

(Continued)

(58) Field of Classification Search
CPC ... G02B 3/14; G02B 7/08; G02B 7/04; G02B 7/102; G02B 7/02; G02B 7/023;
(Continued)

(56) References Cited

U.S. PATENT DOCUMENTS

| | | | | |
|---|---|---|---|---|
| 2010/0172040 A1* | 7/2010 | Kuo | ........................ | G02B 7/08 359/824 |
| 2011/0044679 A1* | 2/2011 | Yoshida | .................. | G02B 7/08 396/133 |

(Continued)

FOREIGN PATENT DOCUMENTS

| | | |
|---|---|---|
| CN | 101770063 A | 7/2010 |
| CN | 101995637 A | 3/2011 |

(Continued)

OTHER PUBLICATIONS

Office Action dated Nov. 26, 2019 in India Application No. 201724012604.
U.S. Appl. No. 15/479,662, filed Apr. 5, 2017.
U.S. Appl. No. 15/479,708, filed Apr. 5, 2017.
U.S. Appl. No. 15/482,112, filed Apr. 7, 2017.

*Primary Examiner* — Mahidere S Sahle
(74) *Attorney, Agent, or Firm* — Muncy, Geissler, Olds & Lowe, P.C.

(57) ABSTRACT

A camera module is provided, including a lens driving mechanism, a lens unit, a housing, and an elastic member. The lens unit is disposed on the lens driving mechanism. The housing surrounds the lens driving mechanism. The elastic member is connected to the lens driving mechanism and comprises a metal base, a first insulation layer, and a first metal wire. The first insulation layer is disposed between the metal base and the first metal wire, and the first metal wire is electrically connected to the lens driving mechanism.

16 Claims, 8 Drawing Sheets

(51) Int. Cl.
*G02B 7/10* (2006.01)

(52) U.S. Cl.
CPC ............... *G03B 2205/0007* (2013.01); *G03B 2205/0046* (2013.01); *G03B 2205/0053* (2013.01)

(58) Field of Classification Search
CPC . G02B 7/026; G02B 7/09; G02B 7/10; G02B 7/105; G02B 13/001; G02B 13/009; G02B 15/14; G02B 23/2476; G02B 27/62; G03B 3/10; G03B 13/34; G03B 13/36; G03B 13/32; G03B 2205/0069; G03B 2205/0084; G03B 2205/0053; G03B 2205/0061; G03B 2217/002
USPC .................................. 359/676–706, 822–826
See application file for complete search history.

(56) References Cited

U.S. PATENT DOCUMENTS

| | | | |
|---|---|---|---|
| 2012/0120513 A1* | 5/2012 | Kotanagi | ................ F03G 7/065 359/824 |
| 2012/0229926 A1* | 9/2012 | Wade | ....................... G02B 7/08 359/824 |
| 2014/0339668 A1 | 11/2014 | Arima et al. | |
| 2015/0029570 A1* | 1/2015 | Ito | .......................... G02B 23/26 359/198.1 |

FOREIGN PATENT DOCUMENTS

| | | |
|---|---|---|
| CN | 104144632 A | 11/2014 |
| EP | 3001244 A1 | 3/2016 |

\* cited by examiner

CAMERA MODULE

CROSS REFERENCE TO RELATED APPLICATIONS

This application claims the benefit of U.S. Provisional Application No. 62/320,096, filed Apr. 8, 2016, U.S. Provisional Application No. 62/356,874, filed Jun. 30, 2016, and Taiwan Patent Application No. 106108890, filed Mar. 17, 2017, the entirety of which are incorporated by reference herein.

BACKGROUND OF THE INVENTION

Field of the Invention

The application relates in general to a camera module, and in particular, to a camera module having an elastic member, wherein the elastic member has at least one metal wire.

Description of the Related Art

As technology has advanced, a lot of electronic devices (for example, cameras and smartphones) have the functionality of taking photographs or recording video. These electronic devices have become more commonplace, and have been developed to be more convenient and thin. More and more choices are provided for users to choose from.

Generally, an electronic device having the functionality of taking photographs or recording video includes a driving module to drive one or more optical lens units to move along an optical axis, so as to facilitate auto-focus and auto-zoom controls. The light can pass through the optical lens units and form an image on an image sensor.

However, since electronic devices have become light and thin, it is hard to dispose a circuit board or lines therein. Therefore, how to address the aforementioned problem has become an important issue.

BRIEF SUMMARY OF INVENTION

To address the deficiencies of conventional products, an embodiment of the invention provides a camera module, including a lens driving mechanism, a lens unit, a housing, and an elastic member. The lens unit is disposed on the lens driving mechanism, and the housing surrounds the lens driving mechanism. The elastic member is connected to the lens driving mechanism, and includes a metal base, a first insulation layer, and a first metal wire. The first insulation layer is disposed between the metal base and the first metal wire, and the first metal wire is electrically connected to the lens driving mechanism.

In some embodiments, the thickness of the metal base exceeds the total thickness of the first insulation layer and the first metal wire.

In some embodiments, the thickness of the metal base is 0.02 mm-0.35 mm.

In some embodiments, the first metal wire is formed on the first insulation layer by using a molded interconnect device.

In some embodiments, the first metal wire is formed on the first insulation layer by coating.

In some embodiments, the metal base and the first metal wire have the same coefficient of thermal expansion.

In some embodiments, the elastic member further comprises a plurality of first metal wires formed on the first insulation layer, wherein the first metal wires are electrically independent.

In some embodiments, the lens driving mechanism comprises a lens holder, and the elastic member further comprises a first fixed portion, a second fixed portion connected to the lens holder, and a string portion connected to the first fixed portion and the second fixed portion. The lens unit is disposed in the lens holder, and a plurality of electrically independent first metal wires are disposed on the string portion.

In some embodiments, the elastic member further comprises a second insulation layer and at least one second metal wire, wherein the second insulation layer is disposed between the second metal wire and the metal base, and the metal base is disposed between the first insulation layer and the second insulation layer.

In some embodiments, the thickness of the metal base exceeds the total thickness of the second insulation layer and the second metal wire.

In some embodiments, the first metal wire is formed on the second insulation layer by using a molded interconnect device.

In some embodiments, the first metal wire is formed on the second insulation layer by coating.

In some embodiments, the metal base and the second metal wire have the same coefficient of thermal expansion.

In some embodiments, the elastic member further comprises a plurality of second metal wires formed on the second insulation layer, wherein the second metal wires are electrically independent.

In some embodiments, the lens driving mechanism comprises a lens holder, and the elastic member further comprises a first fixed portion, a second fixed portion connected to the lens holder, and a string portion connected to the first fixed portion and the second fixed portion. The lens unit is disposed in the lens holder, and a plurality of electrically independent second metal wires are disposed on the string portion.

Another embodiment of the invention provides a camera module, including a lens driving mechanism, a lens unit, and a housing. The lens unit is disposed on the lens driving mechanism, and the housing surrounds the lens driving mechanism. The housing includes a metal member, an insulation layer, and a metal wire. The insulation layer is disposed between the metal member and the metal wire, and the metal wire is electrically connected to the lens driving mechanism.

In some embodiments, the thickness of the metal member exceeds the total thickness of the insulation layer and the metal wire.

In some embodiments, the thickness of the metal member is 0.10 mm-0.35 mm.

In some embodiments, the metal member comprises an inner surface and an outer surface opposite to the inner surface, and the insulation layer and the metal wire are extended from the inner surface to the outer surface.

In some embodiments, the camera module further comprises an elastic member, and the metal wire is electrically connected to the elastic member.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the camera module are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
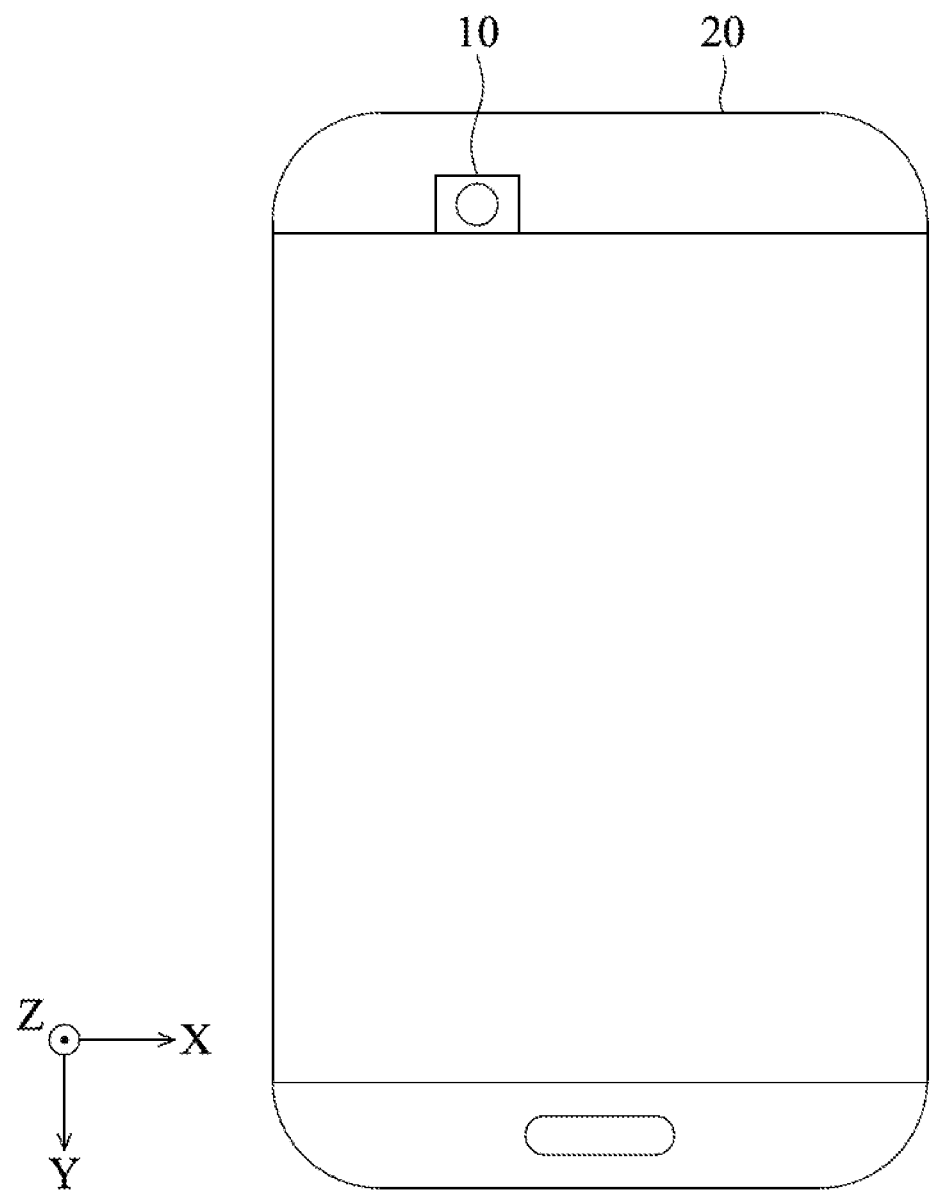
FIG. 1 is a schematic diagram of an electronic device according to an embodiment of the invention.

Referring to FIG. 1, in an embodiment of the invention, the camera module 10 can be disposed in an electronic device 20 and used to take photographs or record video. The electronic device 20 can be a smartphone or a digital camera, for example. When taking photographs or recording video, the camera module 10 can receive the light and form an image, wherein the image can be transmitted to a processor (not shown) in the electronic device 20, where post-processing of the image can be performed.

Figure 2:
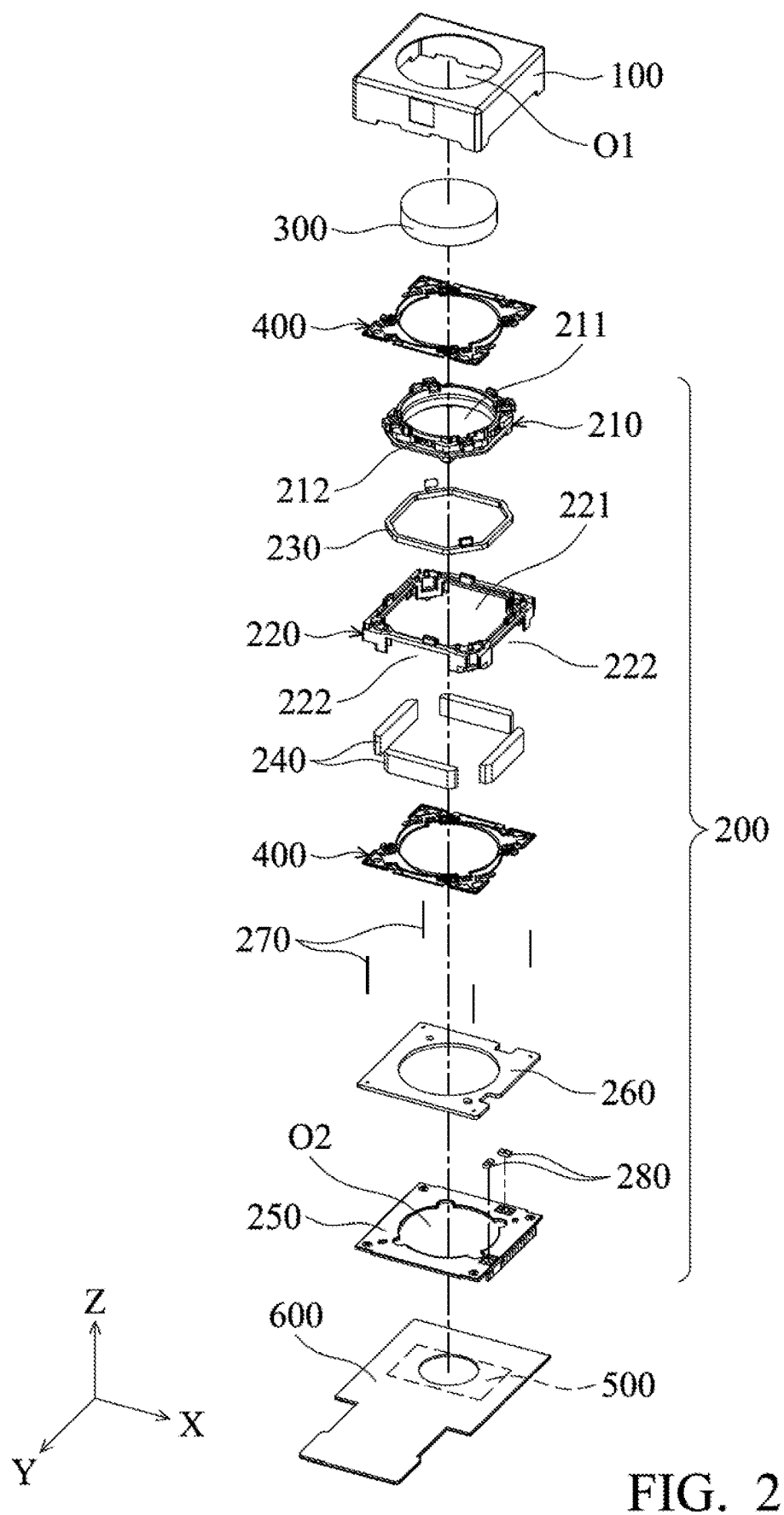
FIG. 2 is an exploded-view diagram of a camera module according to an embodiment of the invention.

As shown in FIG. 2, the camera module 10 primarily comprises a housing 100, a lens driving mechanism 200, a lens unit 300, at least one elastic member 400, an image sensor 500, and a circuit board 600. The lens driving mechanism 200 comprises a lens holder 210, a frame 220, at least one first electromagnetic driving assembly 230, at least one second electromagnetic driving assembly 240, a base 250, a coil board 260, a plurality of suspension wires 270, and a plurality of position detectors 280.

The housing 100 and the base 250 can form a hollow box, and the housing 100 surrounds the lens driving mechanism 200. Therefore, the lens driving mechanism 200, the lens unit 300, and the elastic member 400 can be accommodated in the aforementioned box. The image sensor 500 and the circuit board 600 are disposed on a side of the box, and the housing 100 and the base 250 respectively have an opening O1 and an opening O2. The light can reach the image sensor 500 through the opening O1, the lens unit 300, and the opening O2 in sequence, so as to form an image on the image sensor 500.

The lens holder 210 has an accommodating space 211 and a concave structure 212, wherein the accommodating space 211 is formed at the center of the lens holder 210, and the concave structure 212 is formed on the outer wall of the lens holder 210 and surrounds the accommodating space 211. The lens unit 300 can be affixed to the lens holder 210 and accommodated in the accommodating space 211. The first electromagnetic driving assembly 230 can be disposed in the concave structure 212.

The frame 220 has a receiving portion 221 and a plurality of recesses 222. The lens holder 210 is received in the receiving portion 221, and the second electromagnetic driving assembly 240 is affixed in the recess 222 and adjacent to the first electromagnetic driving assembly 230.

The lens holder 210 and the lens unit 300 disposed thereon can be driven by the electromagnetic induction between the first electromagnetic driving assembly 230 and the second electromagnetic driving assembly 240 to move relative to the frame 220 along the direction of the Z-axis. For example, in this embodiment, the first electromagnetic driving assembly 230 can be a driving coil surrounding the accommodating space 211 of the lens holder 210, and the second electromagnetic driving assembly 240 can comprise at least one magnet.

When a current flows through the driving coil (the first electromagnetic driving assembly 230), electromagnetic induction is generated between the driving coil and the magnet. Thus, the lens holder 210 and the lens unit 300 disposed thereon can be driven to move relative to the frame 220 along the direction of the Z-axis, and the purpose of focus adjustment can be achieved.

In some embodiments, the first electromagnetic driving assembly 230 can be a magnet, and the second electromagnetic driving assembly 240 can be a driving coil.

Referring to FIG. 2, in this embodiment, the camera module 10 comprises two elastic members 400 respectively disposed on opposite sides of the lens holder 210 and the frame 220, and the lens holder 210 and the frame 220 can be disposed therebetween. The elastic members 400 can connect the lens holder 210 to the housing 100 or the frame 220. The lens holder 210 can be hung in the receiving portion 221 of the frame 220 by the elastic members 400, and the range of motion of the lens holder 210 in the direction of the Z-axis can be restricted by the elastic members 400.

Figure 3A:
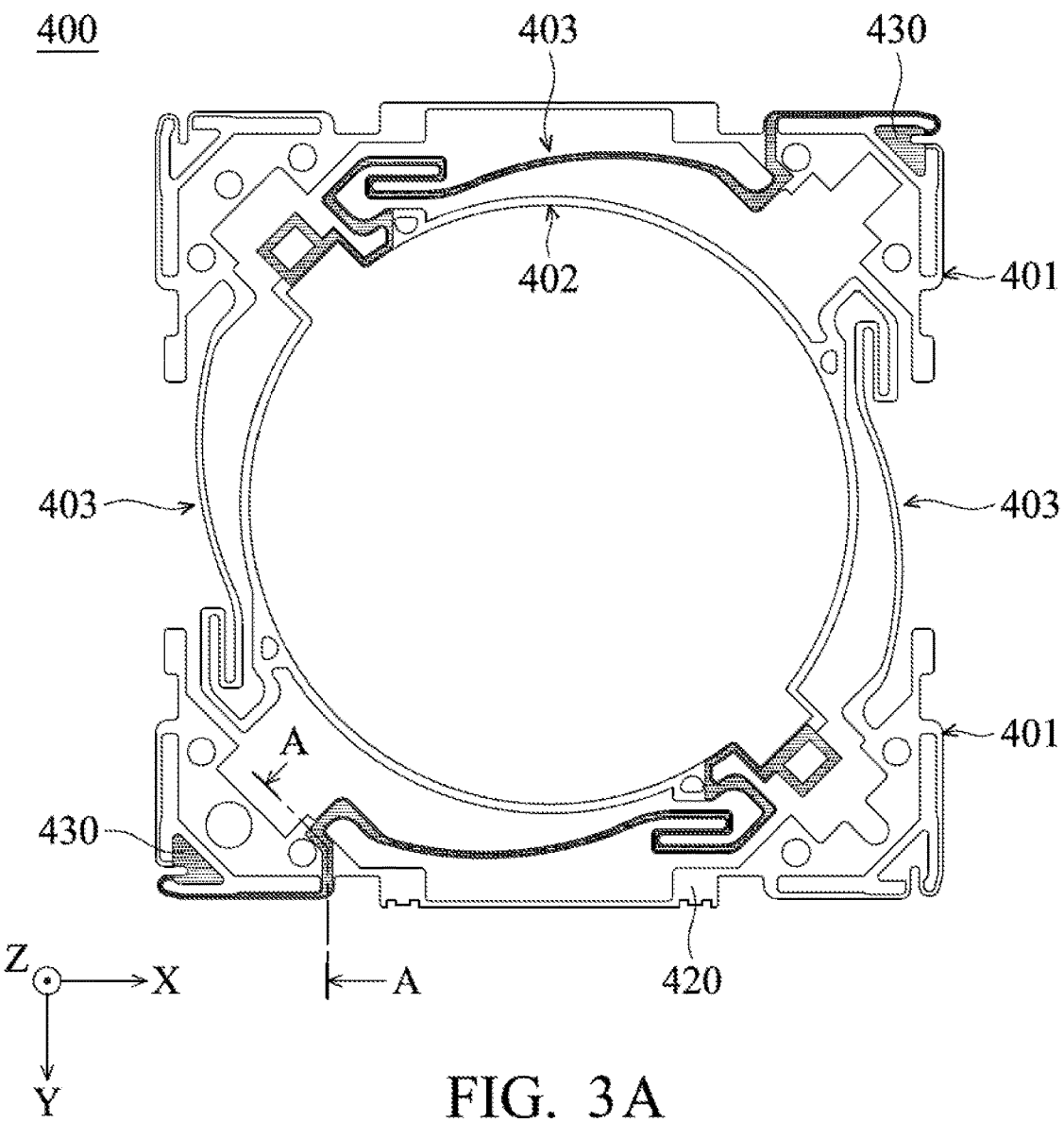
FIG. 3A is a schematic diagram of an elastic member according to an embodiment of the invention.

As shown in FIG. 3A, the elastic member 400 can comprise at least one first fixed portion 401, at least one second fixed portion 402, and at least one string portion 403. The first fixed portion 401 is affixed to the housing 100 or frame 220, the second fixed portion 402 is affixed to the lens holder 210, and the string portion 403 is connected to the first fixed portion 401 and the second fixed portion 402.

Figure 3B:
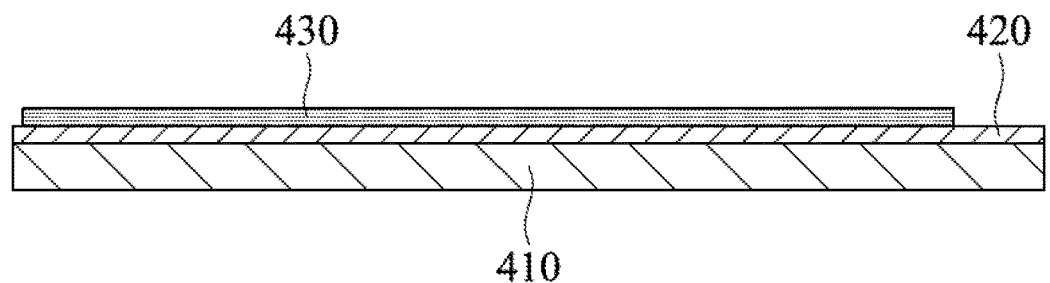
FIG. 3B is a cross-sectional view along line A-A in FIG. 3A.

FIG. 3B is a cross-sectional view along line A-A in FIG. 3A. Referring to FIGS. 3A and 3B, the elastic member 400 can comprise a metal base 410, a first insulation layer 420, and at least one first metal wire 430, wherein the first insulation layer 420 is disposed between the metal base 410 and the first metal wire 430.

The thickness of the metal base 410 in the direction of the Z-axis exceeds the total thickness of the first insulation layer 420 and the first metal wire 430 in the direction of the Z-axis. For example, the thickness of the metal base 410 can be 0.02 mm-0.35 mm. The metal base 410 and the first metal wire 430 can have the same coefficient of thermal expansion, such that when the elastic member 400 is heated, relative displacement is not generated between the metal base 410 and the first metal wire 430.

It should be noted that, as shown in FIGS. 3A and 3B, the elastic member 400 can comprise a plurality of first metal wires 430. These first metal wires 430 are separated from each other and electrically independent. These first metal wires 430 can be extended from the first fixed portion 401 to the second fixed portion 402 through the string portion 403. The ends of each of the first metal wires 430 disposed on the first fixed portion 401 and the second fixed portion 402 are used to electrically connect the other members (such as the suspension wires 270).

Figure 4A:
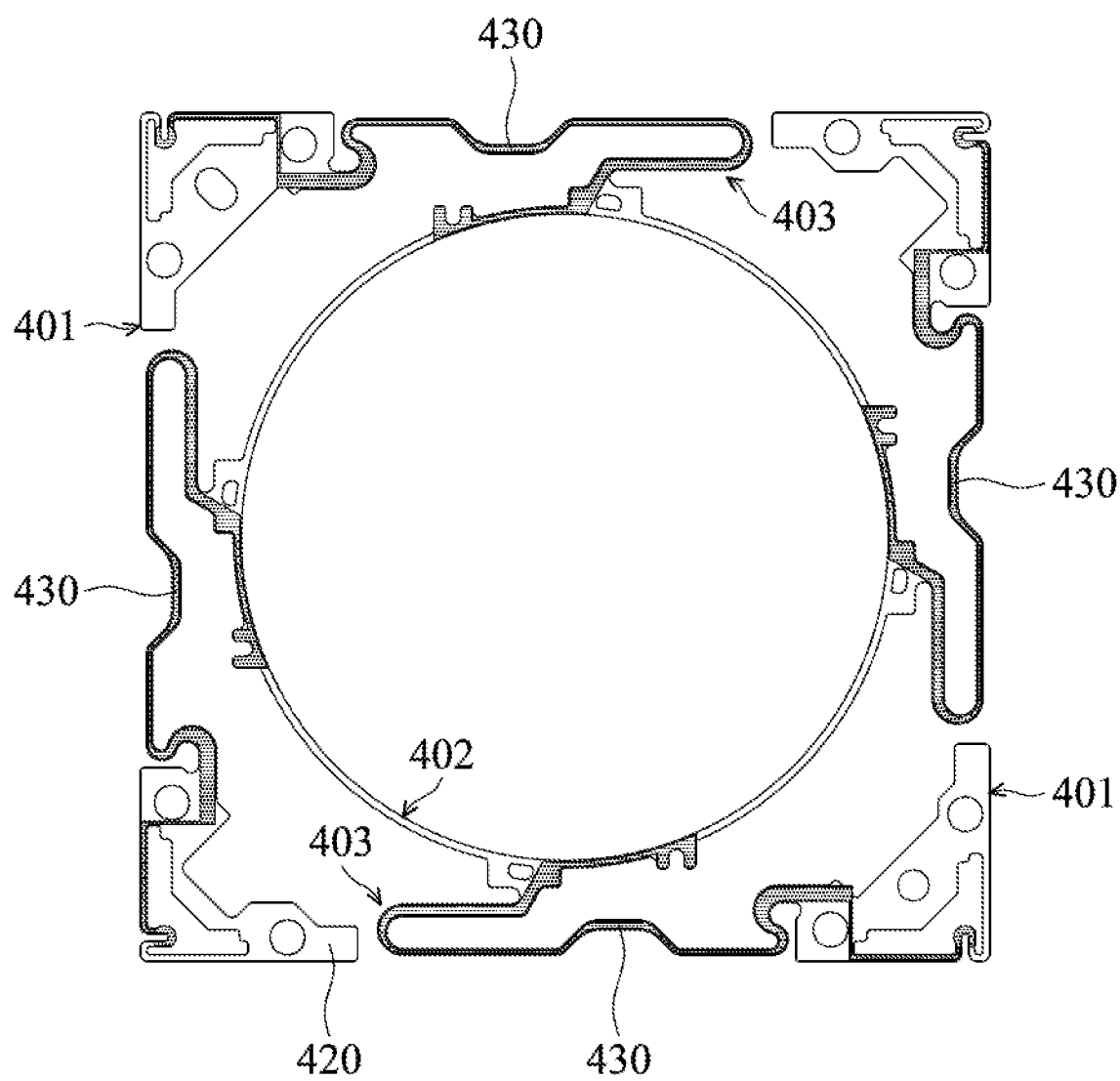
FIG. 4A is a schematic diagram of an elastic member according to another embodiment of the invention.
Figure 4B:
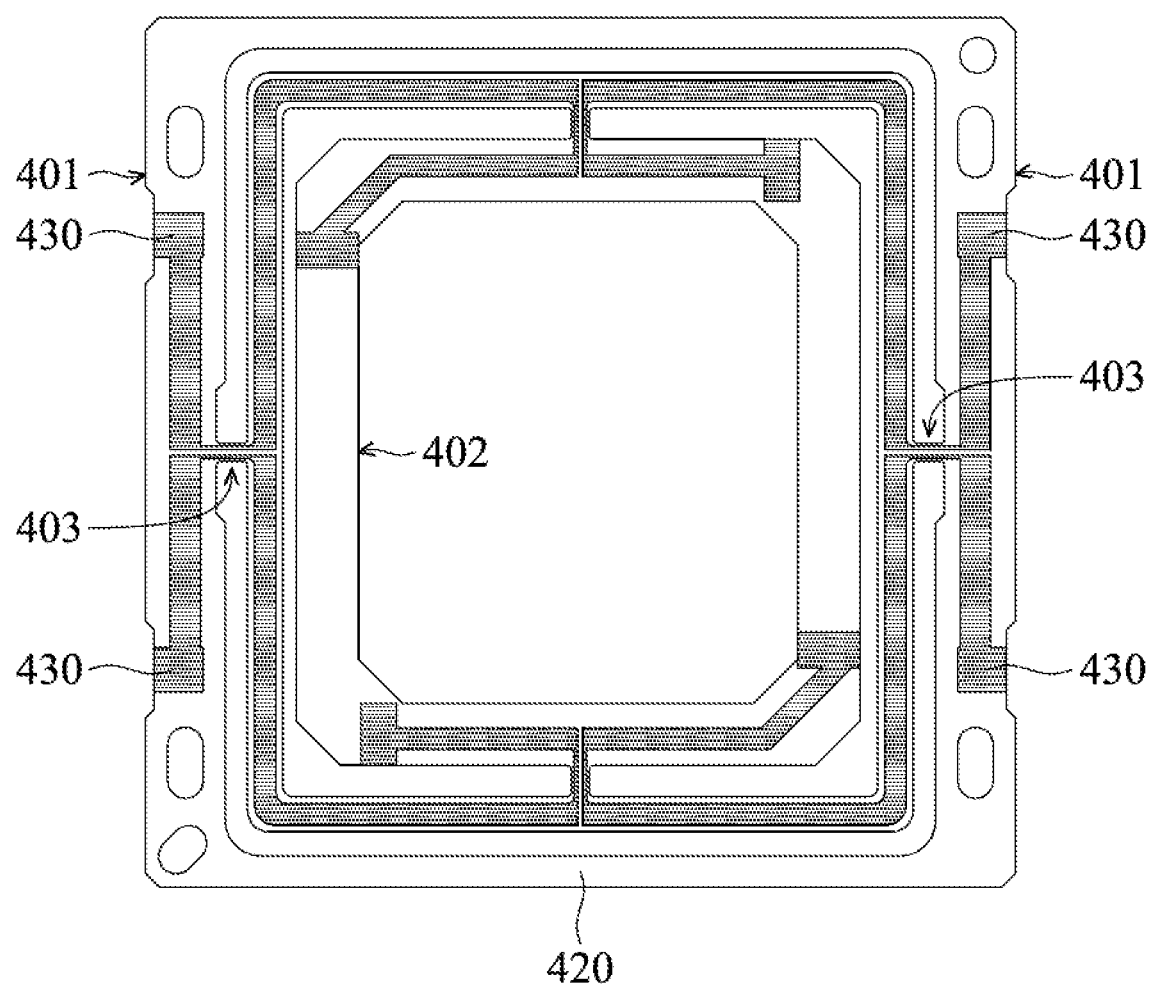
FIG. 4B is a schematic diagram of an elastic member according to another embodiment of the invention.

Referring to FIG. 4A, in another embodiment, the elastic member 400 can comprise more than two first metal wires 430. For example, in this embodiment, the elastic member 400 comprises four first metal wires 430. Referring to FIG. 4B, in another embodiment, the electrically independent first metal wires 430 separated from each other can extend through the same string portion 403. That is, a plurality of electrically independent first metal wires 430 are disposed on each string portion 403.

Figure 4C:
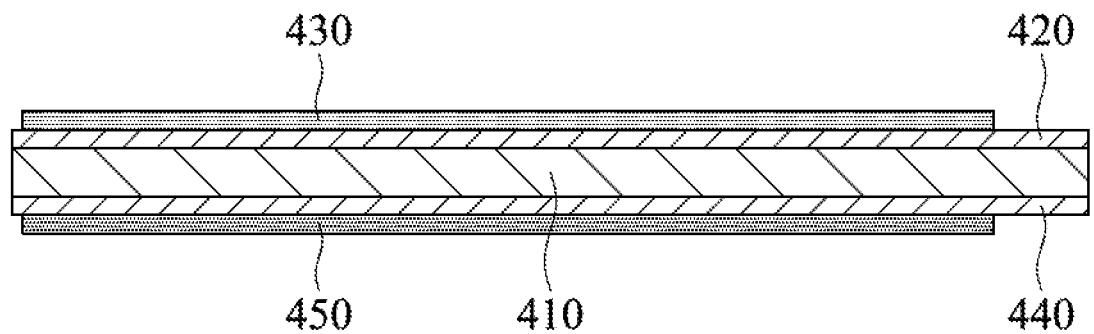
FIG. 4C is a schematic diagram of an elastic member according to another embodiment of the invention.

Referring to FIG. 4C, in another embodiment, the elastic member 400 further comprises a second insulation layer 440 and at least one second metal wire 450. The metal base 410 is disposed between the first insulation layer 420 and the second insulation layer 440, and the second insulation layer 440 is disposed between the metal base 410 and the second metal wire 450.

Similarly, the thickness of the metal base 410 in the direction of the Z-axis exceeds the total thickness of the second insulation layer 440 and the second metal wire 450 in the direction of the Z-axis. The metal base 410 and the second metal wire 450 can have the same coefficient of thermal expansion, such that when the elastic member 400 is heated, relative displacement is not generated between the metal base 410 and the second metal wire 450. When a plurality of second metal wires 450 are disposed on the second insulation layer 440, these second metal wires 450 can be separated from each other and electrically independent, and the arrangement of the second metal wires 450 can be similar to that of the first metal wires 430 in FIGS. 3A, 3B, or 4B.

Since the electrically independent first metal wires 430 and the electrically independent second metal wires 450 can be arranged on the elastic member 400, the elastic member 400 does not need to be divided even when two or more conductive paths are needed. Thus, the integration of the elastic member 400 can be achieved, and the assembly of the elastic member 400 is facilitated. Furthermore, since the integrated elastic member 400 can be achieved, the elastic force applied on the lens holder 210 can be uniform, and the displacement of the lens unit 300 driven by the lens driving mechanism 200 is more accurate. Moreover, the integrated elastic member 400 has a larger fixed area relative to the divided elastic member. Therefore, the separation of the elastic member 400 from the housing 100, the frame 220 or the lens holder 210 due to collision of the camera module 10 can be avoided.

The first metal wires 430 and the second metal wires 450 can be respectively formed on the first insulation layer 420 and the second insulation layer 440 by using a molded interconnect device (MID), for example, by laser direct structuring (LDS), microscopic integrated processing technology (MIPTEC), laser induced metallization (LIM), laser restructuring print (LRP), an aerosol jet process, or a two-shot molding method. In some embodiments, the first metal wires 430 and the second metal wires 450 can be respectively formed on the first insulation layer 420 and the second insulation layer 440 by coating.

Referring to FIG. 2, the coil board 260 is disposed on the base 250. When a current flows through the coil board 260, electromagnetic induction is generated between the coil board 260 and the second electromagnetic driving assembly 240 (or the first electromagnetic driving assembly 230). Thus, the lens holder 210 and the frame 220 can be driven to move relative to coil board 260 along the direction of the X-axis and/or the direction of the Y-axis, and the lens unit 300 can be driven to move relative to image sensor 500 along the direction of the X-axis and/or the direction of the Y-axis. The purpose of image stabilization can be achieved.

In this embodiment, the camera module 10 comprises four suspension wires 270. Four suspension wires 270 are respectively disposed on the four corners of the coil board 260 and connect the base 250, the coil board 260, and the elastic member 400. When the lens holder 210 and the lens unit 300 moves along the direction of the X-axis and/or the direction of the Y-axis, the suspension wires 270 can restrict their range of motion. Moreover, since the suspension wires 270 comprise metal (for example, copper or an alloy thereof), the suspension wires 270 can be used as a conductor, for example, the current can flow into the first electromagnetic driving assembly 230 through the base 250, the suspension wires 270, and the first metal wires 430 of the metal member 400.

The position detectors 280 are disposed on the base 250, wherein the position detectors 280 can detect the movement of the second electromagnetic driving assembly 240 to confirm the position of the lens holder 210 and the lens unit 300 in the direction of the X-axis and the direction of the Y-axis.

For example, the position detector 280 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

Figure 5:
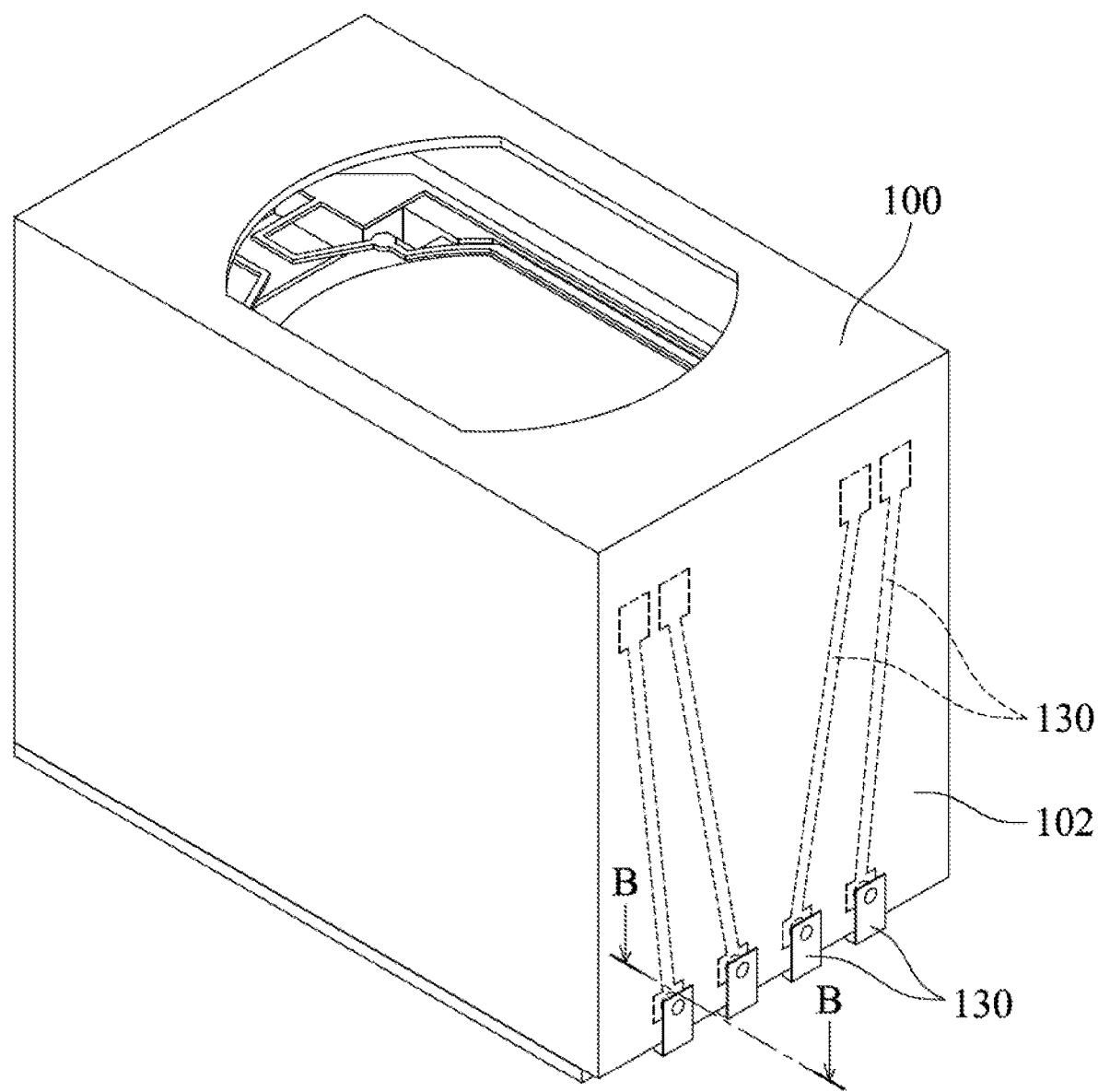
FIG. 5 is an schematic diagram of a camera module according to another embodiment of the invention.
Figure 6:
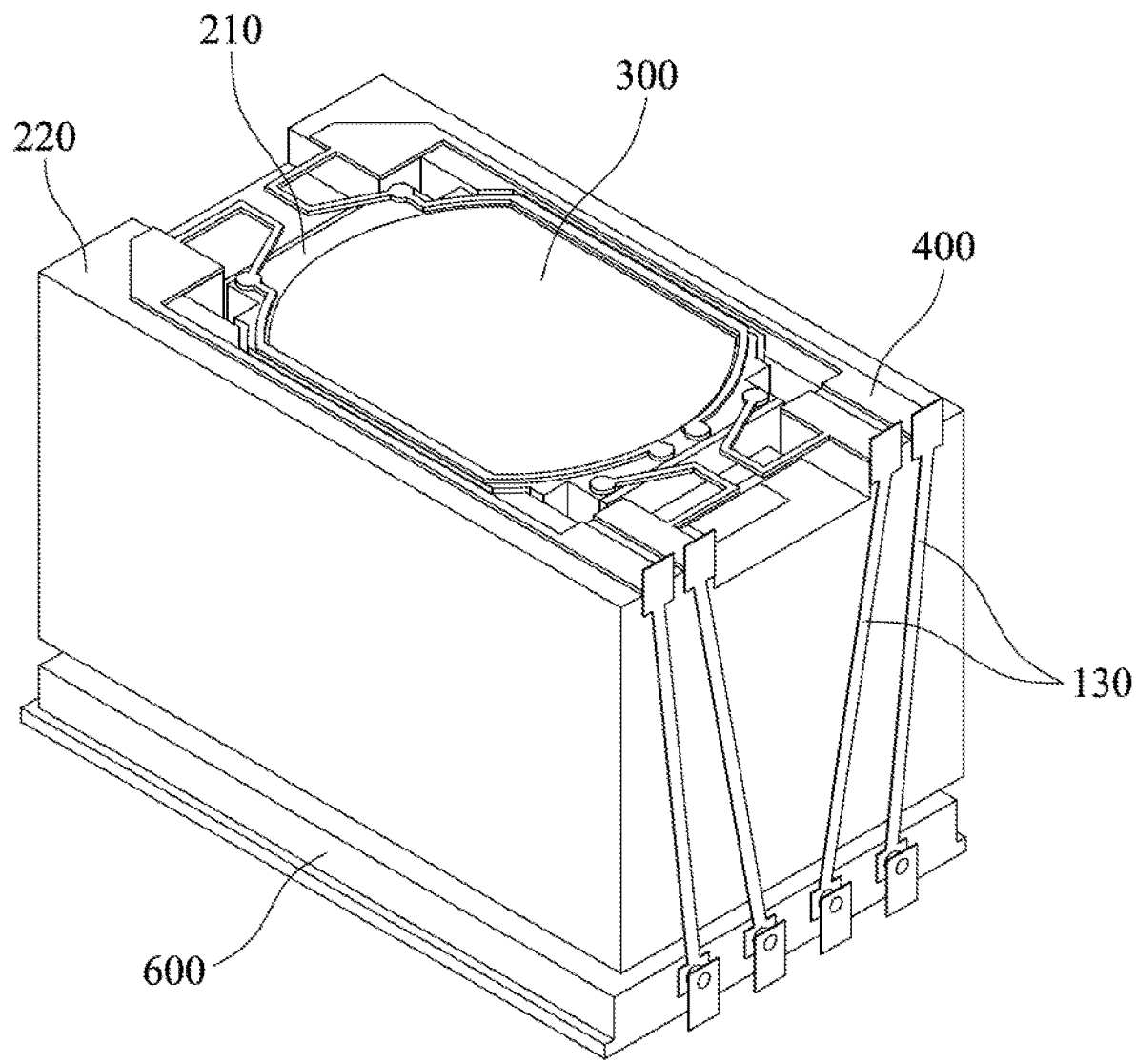
FIG. 6 is an schematic diagram of the camera module in FIG. 5, wherein a portion of the housing is omitted.
Figure 7:
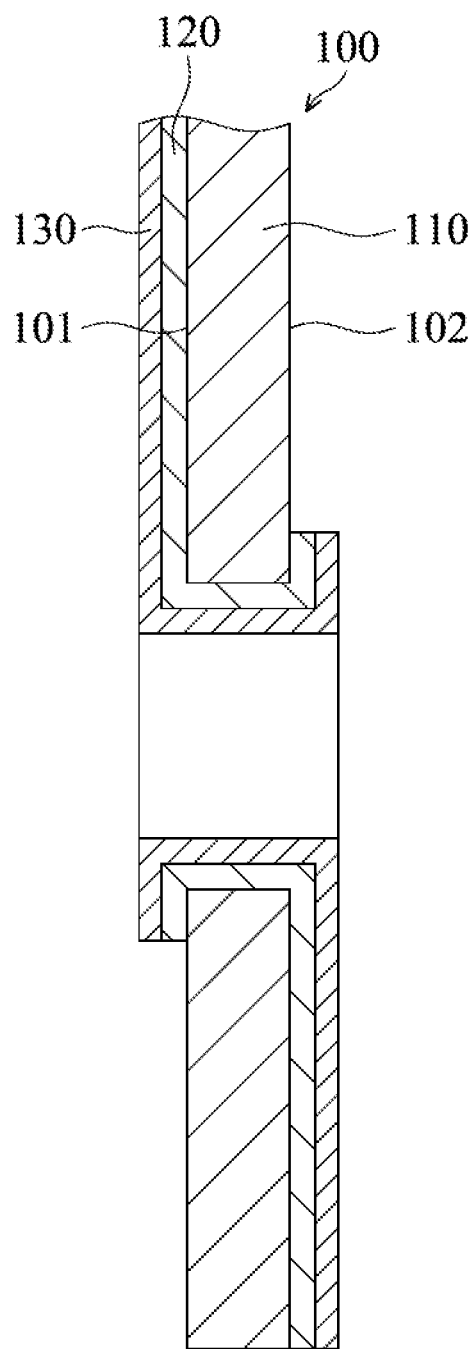
FIG. 7 is a cross-sectional view along line B-B in FIG. 5.

Referring to FIGS. 5-7, in another embodiment of the invention, the housing 100 comprises a metal member 110, an insulation layer 120, and at least one metal wire 130, wherein the insulation layer 120 is disposed between the metal member 110 and the metal wire 130. One end of the metal wire 130 is connected to the elastic member 400, and the metal wire 130 and the insulation layer 120 are extended from the inner surface 101 of the housing 100 to the outer surface 102. Therefore, the other end of the metal wire 130 can be exposed, and the other electronic members in the electronic device 20 can be electrically connected to the metal wire 130 via the exposed end.

The thickness of the metal member 110 exceeds the total thickness of the insulation layer 120 and the metal wire 130. For example, the thickness of the metal member 110 can be 0.10 mm-0.35 mm. The metal member 110 and the metal wire 130 can have the same coefficient of thermal expansion.

Since further circuit boards are not needed for connecting the lens driving mechanism 200 in the camera module 10 and the electronic members in the electronic device 20, the volume of the camera module 10 can be reduced, and the camera module 10 can be disposed in a miniaturized electronic device 20. Moreover, the manufacturing process can be simplified, and the heat dissipation efficiency of the camera module 10 can be improved.

In summary, a camera module is provided, wherein a plurality of electrically independent metal wires can be arranged on the elastic member of camera module, and the integrated elastic member can be achieved. Furthermore, the housing of the camera module can comprise metal wires for connecting the lens driving mechanism to the external electronic members.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A camera module, comprising:
a lens driving mechanism for connecting an optical element with an optical axis;
a housing, surrounding the lens driving mechanism; and
an elastic member, connected to the lens driving mechanism, comprising:
  a metal base, having a plate structure and a first portion extending along a first direction;
  a plurality of first metal wires, wherein the plurality of first metal wires have a plurality of second portions extending along the first direction, and the plurality of second portions are at least partially disposed on the first portion;
  wherein the plurality of second portions are arranged along a second direction that is perpendicular to the first direction;
  wherein the plurality of second portions at least partially overlap the first portion as observed from the optical axis, and the plurality of second portions overlap to each other as observed from the second direction;
  a first insulation layer, disposed between the metal base and each of the plurality of the first metal wires, wherein each of the plurality of the first metal wires is electrically connected to the lens driving mechanism, wherein each of the plurality of the first metal wires does not exceed an outline of the metal base as observed from the optical axis.

2. The camera module as claimed in claim 1, wherein the thickness of the metal base exceeds the total thickness of the first insulation layer and the plurality of the first metal wires.

3. The camera module as claimed in claim 1, wherein thickness of the metal base is 0.02 mm-0.35 mm.

4. The camera module as claimed in claim 1, wherein each of the plurality of the first metal wires is formed on the first insulation layer by using a molded interconnect device.

5. The camera module as claimed in claim 1, wherein each of the plurality of the first metal wires is formed on the first insulation layer by coating.

6. The camera module as claimed in claim 1, wherein the metal base and the plurality of the first metal wires have the same coefficient of thermal expansion.

7. The camera module as claimed in claim 1, wherein the plurality of the first metal wires are electrically independent.

8. The camera module as claimed in claim 7, wherein the lens driving mechanism comprises a lens holder, and the elastic member comprises:
a first fixed portion;
a second fixed portion, connected to the lens holder; and
a string portion, connected to the first fixed portion and the second fixed portion, wherein the plurality of the first metal wires that are electrically independent are disposed on the string portion.

9. The camera module as claimed in claim 1, wherein the elastic member further comprises:
at least one second metal wire; and
a second insulation layer, disposed between the second metal wire and the metal base, wherein the metal base is disposed between the first insulation layer and the second insulation layer.

10. The camera module as claimed in claim 9, wherein the thickness of the metal base exceeds the total thickness of the second insulation layer and the second metal wire.

11. The camera module as claimed in claim 9, wherein the second metal wire is formed on the second insulation layer by using a molded interconnect device.

12. The camera module as claimed in claim 9, wherein the second metal wire is formed on the second insulation layer by coating.

13. The camera module as claimed in claim 9, wherein the metal base and the second metal wire have the same coefficient of thermal expansion.

14. The camera module as claimed in claim 9, wherein the elastic member further comprises a plurality of second metal wires formed on the second insulation layer, wherein the second metal wires are electrically independent.

15. The camera module as claimed in claim 9, wherein the lens driving mechanism comprises a lens holder, and the elastic member comprises:
a first fixed portion;
a second fixed portion, connected to the lens holder; and
a string portion, connected to the first fixed portion and the second fixed portion, wherein a plurality of electrically independent second metal wires are disposed on the string portion.

16. The camera module as claimed in claim 1, wherein each of the plurality of the first metal wires completely overlaps the metal base while a portion of the metal base does not overlap the plurality of the first metal wires as observed from the optical axis.

* * * * *